(12) United States Patent
Boutros et al.

(10) Patent No.: US 10,270,697 B2
(45) Date of Patent: *Apr. 23, 2019

(54) E-TREE SERVICE WITH OPTIMAL FORWARDING IN EVPN

(71) Applicant: Cisco Technology, Inc., San Jose, CA (US)

(72) Inventors: Sami Boutros, San Ramon, CA (US); Ali Sajassi, San Ramon, CA (US); Samer Salam, Vancouver (CA)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/647,479

(22) Filed: Jul. 12, 2017

(65) Prior Publication Data
US 2017/0310598 A1    Oct. 26, 2017

Related U.S. Application Data

(63) Continuation of application No. 14/231,853, filed on Apr. 1, 2014, now Pat. No. 9,742,678.

(51) Int. Cl.
*H04L 12/24* (2006.01)
*H04L 12/813* (2013.01)
(Continued)

(52) U.S. Cl.
CPC .......... *H04L 47/20* (2013.01); *H04L 12/1886* (2013.01); *H04L 12/462* (2013.01);
(Continued)

(58) Field of Classification Search
CPC ......... H04L 45/16; H04L 45/00; H04L 45/44; H04L 45/48; H04L 45/50; H04L 45/66;
(Continued)

(56) References Cited

U.S. PATENT DOCUMENTS 8,724,629 B1 * 5/2014 Goli .................... H04L 12/4625
                                                              370/392
9,843,507 B2 * 12/2017 Yong ........................ H04L 45/04
(Continued)

OTHER PUBLICATIONS

Key et al., "Requirements for MEF E-Tree Support in L2VPN", Network Working Group, Internet Draft, draft-ieft-12vpn-etree-reqt-04, Apr. 2013, 14 pages, Internet Engineering Task Force Trust.
(Continued)

*Primary Examiner* — Hoang-Chuong Q Vu
(74) *Attorney, Agent, or Firm* — Behmke Innovation Group LLC; James Behmke; Stephen D. LeBarron

(57) ABSTRACT

In one embodiment, when an ingress provider edge (PE) device of a computer network domain receives a frame at the ingress PE device destined to a destination media access control (MAC) address, it can determine whether the frame was received on a root or leaf Ethernet ingress segment, and also whether the destination MAC address is located via a root or leaf Ethernet segment. Accordingly, the ingress PE device may either drop or forward the frame based on the ingress Ethernet segment and destination MAC address Ethernet segment being either a root or a leaf, respectively.

20 Claims, 9 Drawing Sheets

(51) Int. Cl.
  *H04L 12/823* (2013.01)
  *H04L 12/801* (2013.01)
  *H04L 12/18* (2006.01)
  *H04L 12/715* (2013.01)
  *H04L 12/46* (2006.01)
  *H04L 12/721* (2013.01)
  *H04L 12/741* (2013.01)
  *H04L 12/753* (2013.01)

(52) U.S. Cl.
  CPC ............ *H04L 41/12* (2013.01); *H04L 45/04* (2013.01); *H04L 47/16* (2013.01); *H04L 47/32* (2013.01); *H04L 47/33* (2013.01); *H04L 45/48* (2013.01); *H04L 45/54* (2013.01); *H04L 45/66* (2013.01)

(58) Field of Classification Search
  CPC ....... H04L 45/68; H04L 45/745; H04L 47/12; H04L 47/16; H04L 47/20; H04L 47/32; H04L 47/33; H04L 12/44; H04L 12/462; H04L 12/4654; H04L 12/4658; H04L 12/4679
  See application file for complete search history.

(56) References Cited

U.S. PATENT DOCUMENTS

| | | | | |
|---|---|---|---|---|
| 2010/0074098 | A1* | 3/2010 | Zeng | H04L 12/44 370/217 |
| 2010/0316053 | A1* | 12/2010 | Miyoshi | H04L 45/00 370/392 |
| 2011/0164617 | A1* | 7/2011 | Yong | H04L 45/04 370/392 |
| 2011/0292937 | A1* | 12/2011 | Gupta | H04L 45/16 370/390 |
| 2012/0300784 | A1* | 11/2012 | Jiang | H04L 12/462 370/395.53 |
| 2013/0003607 | A1* | 1/2013 | Kini | H04L 45/66 370/256 |
| 2013/0003737 | A1 | 1/2013 | Sinicrope | |
| 2013/0058208 | A1* | 3/2013 | Pfaff | H04L 12/4633 370/217 |
| 2013/0121164 | A1* | 5/2013 | Shabtay | H04L 41/0663 370/241.1 |

OTHER PUBLICATIONS

Sajassi et al., "E-TREE Support in E-VPN", L2VPN Workgroup, Internet Draft, draft-sajassi-12vpn-evpn-etree-01, Oct. 2012, 9 pages, Internet Engineering Task Force Trust.

Sajassi et al., "BGP MPLS Based Ethernet VPN", Network Working Group, Internet Draft, draft-ietf-12vpn-evpn-05, Feb. 2014, 49 pages, Internet Engineering Task Force Trust.

Extended European Search Report and European Search Opinion dated Jul. 22, 2015 in connection with European Application No. 15 15 9931.

Sajassi et al., "E-TREE Support in EVPN & PBB-EVPN"; draft-sajassi-12VPN-evpn-etree-02, Internet Engineering Task Force, IETF; Standardworkingdraft, Internet Society (ISOC), Oct. 21, 2013, 11 pages.

* cited by examiner

| MAC ADDRESS 405 | FORWARDING INFO 410 | ROOT/LEAF 415 |
|---|---|---|
| MAC-A | PORT-1 | ROOT |
| MAC-B | PORT-2 | LEAF |
| MAC-C | PORT-3 | LEAF |
| ... | ... | ... |

TABLE 400

FIG. 4

E-TREE SERVICE WITH OPTIMAL FORWARDING IN EVPN

RELATED APPLICATION

The present application is a Continuation application of U.S. patent application Ser. No. 14/231,853, filed Apr. 1, 2014, entitled E-TREE SERVICE WITH OPTIMAL FORWARDING IN EVPN, by Sami Boutros et al., the contents of which is hereby incorporated by reference.

TECHNICAL FIELD

The present disclosure relates generally to computer networks, and, more particularly, to E-TREE service with optimal forwarding in EVPN.

BACKGROUND

Ethernet Virtual Private Tree (E-TREE), or rooted point-to-multipoint Ethernet Virtual Connection (EVC), is a Layer 2 service defined by the Metro-Ethernet Forum (MEF) that provides an Ethernet virtual local area network (VLAN) configuration suitable for multicast services. Illustratively, the Internet Engineering Task Force (IETF) Internet Draft entitled "Requirements for MEF E-Tree Support in VPLS"<draft-ietf-l2vpn-etree-reqt> by Key et al. specifies the requirements for supporting MEF E-TREE service in layer-2 virtual private network (L2VPN). Other types of EVCs defined for Carrier Ethernet networking are the E-Line and E-LAN.

The sites in an E-TREE service have constrained connectivity, and are designated as being Root and/or Leaf. The service is set up such that:

Root sites can communicate with all other sites (Root or Leaf).

Leaf sites can communicate with Root sites, but not with other Leaf sites.

All solutions for addressing E-TREE in L2VPN (whether for virtual private LAN service (VPLS), Virtual Private Multicast Service (VPMS) or Ethernet Virtual Private Network (EVPN)) rely on an egress-filtering model. This means that the egress (i.e., disposition) provider edge (PE) device decides on whether to forward or drop traffic destined to a local attachment circuit, to satisfy the E-TREE connectivity constraints. This model unnecessarily wastes the bandwidth of the Multi-Protocol Label Switching (MPLS) network, where leaf-to-leaf traffic, all known unicast traffic, and ingress-replicated multi-destination traffic (broadcast, unicast unknown, and multicast (BUM) traffic), is transported over the MPLS network only to be dropped on the egress PE.

BRIEF DESCRIPTION OF THE DRAWINGS

The embodiments herein may be better understood by referring to the following description in conjunction with the accompanying drawings in which like reference numerals indicate identically or functionally similar elements, of which:

FIG. 4 illustrates an example table format;

DESCRIPTION OF EXAMPLE EMBODIMENTS

Overview

According to one or more embodiments of the disclosure, when an ingress provider edge (PE) device of a computer network domain receives a frame at the ingress PE device destined to a destination media access control (MAC) address, it can determine whether the frame was received on a root or leaf Ethernet ingress segment, and also whether the destination MAC address is located via a root or leaf Ethernet segment. Accordingly, the ingress PE device may either drop or forward the frame based on the ingress Ethernet segment and destination MAC address Ethernet segment being either a root or a leaf, respectively.

Description

A computer network is a geographically distributed collection of nodes interconnected by communication links and segments for transporting data between end nodes, such as personal computers and workstations. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. The Internet is an example of a WAN that connects disparate networks throughout the world, providing global communication between nodes on various networks. The nodes typically communicate over the network by exchanging discrete frames or packets of data according to pre-defined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Since management of interconnected computer networks can prove burdensome, smaller groups of computer networks may be maintained as routing domains or autonomous systems. The networks within an autonomous system (AS) are typically coupled together by conventional "intradomain" routers configured to execute intradomain routing protocols, and are generally subject to a common authority. To improve routing scalability, a service provider (e.g., an ISP) may divide an AS into multiple "areas" or "levels." It may be desirable, however, to increase the number of nodes capable of exchanging data; in this case, interdomain routers executing interdomain routing protocols are used to interconnect nodes of the various ASes. Moreover, it may be desirable to interconnect various ASes that operate under different administrative domains. As used herein, an AS, area, or level is generally referred to as a "domain."

Figure 1:
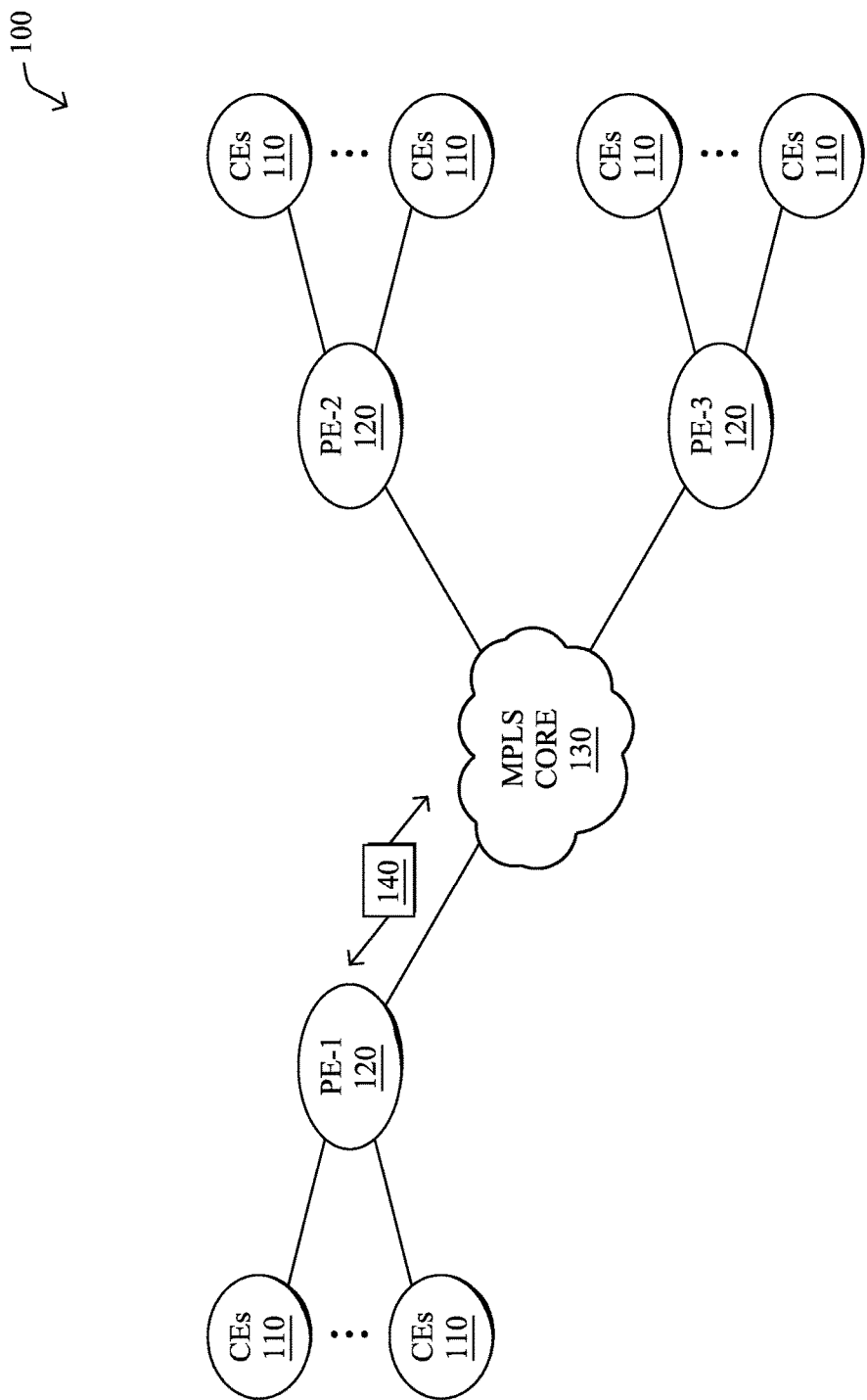
FIG. 1 illustrates an example computer network.

FIG. 1 is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative Multi-Protocol Label Switching (MPLS) core network 130. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity. Those skilled in the art will also understand that while the embodiments described herein are described generally for inter-AS operation, the present disclosure may apply to any similar inter-domain network configuration where similar techniques would be suitable.

Figure 2:
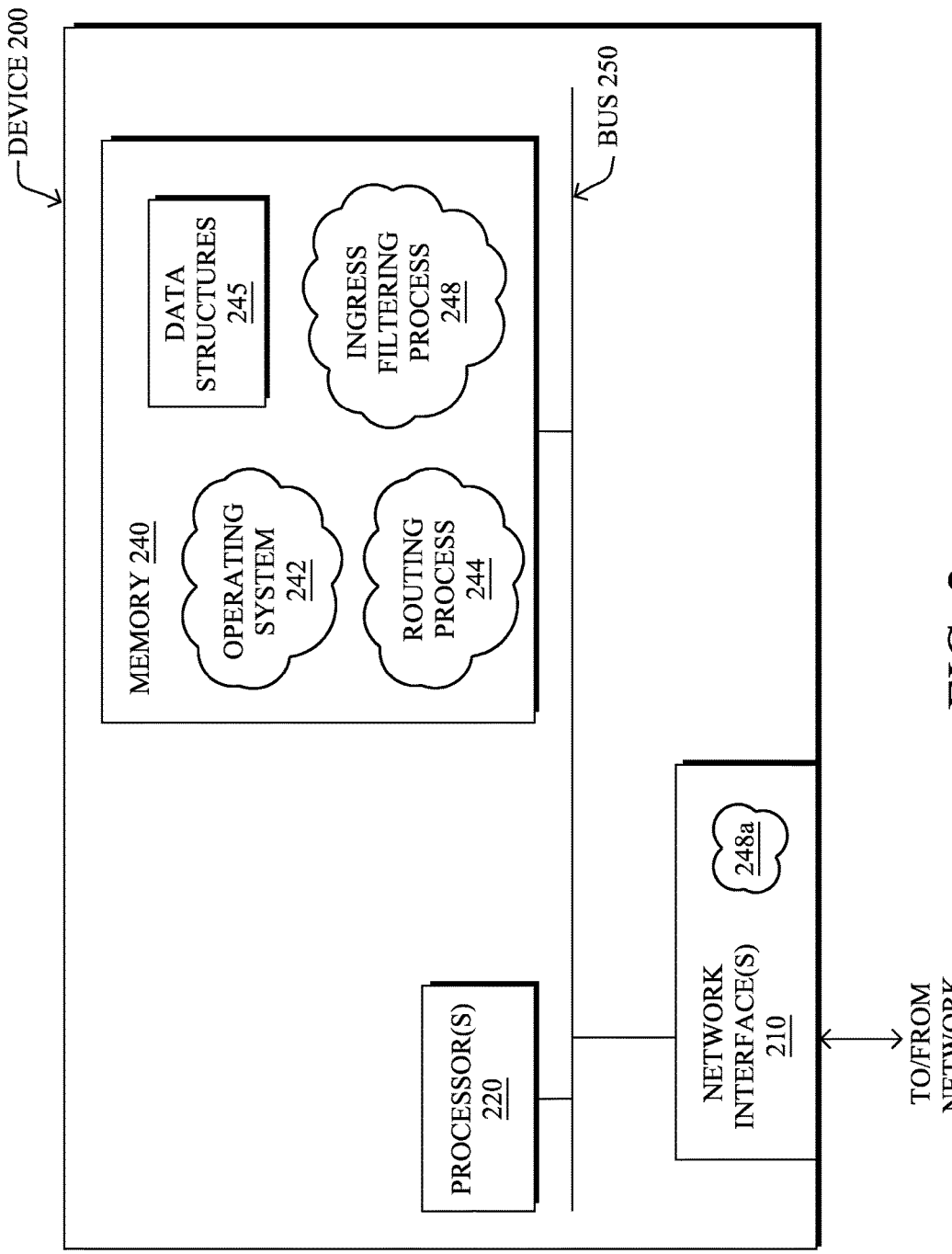
FIG. 2 illustrates an example network device/node.

FIG. 2 is a schematic block diagram of an example node/device 200 that may be used with one or more embodiments described herein, e.g., any of the routers as shown in FIG. 1, particularly the PEs 120. Device 200 comprises a plurality of network interfaces 210, one or more processors 220, and a memory 240 interconnected by a system bus 250. The network interfaces 210 contain the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for Virtual Private Network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc.), portions of which are typically resident in memory 240 and executed by the processor(s), functionally organizes the node by, inter alia, invoking network operations in support of software processes and/or services executing on the device. These software processes and/or services may comprise routing services 244 and an illustrative ingress filtering process 248, as described herein, which may alternatively be located within individual network interfaces (e.g., process 248*a*).

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Routing process/services 244 contain computer executable instructions executed by processor 220 to perform functions provided by one or more routing protocols, such as the Interior Gateway Protocol (IGP) (e.g., Open Shortest Path First, "OSPF," and Intermediate-System-to-Intermediate-System, "IS-IS"), the Border Gateway Protocol (BGP), etc., as will be understood by those skilled in the art. These functions may be configured to manage a forwarding information database containing, e.g., data used to make forwarding decisions. In particular, changes in the network topology may be communicated among routers 200 using routing protocols, such as the conventional OSPF and IS-IS link-state protocols (e.g., to "converge" to an identical view of the network topology).

Notably, routing services 244 may also perform functions related to virtual routing protocols, such as maintaining VRF instances, or tunneling protocols, such as for MPLS, generalized MPLS (GMPLS), etc., each as will be understood by those skilled in the art. Also, EVPN, e.g., as described in the IETF Internet Draft entitled "BGP MPLS Based Ethernet VPN"<draft-ietf-l2vpn-evpn>, introduces a solution for multipoint L2VPN services, with advanced multi-homing capabilities, using BGP for distributing customer/client media access control (MAC) address reach-ability information over the core MPLS/IP network.

Figure 3:
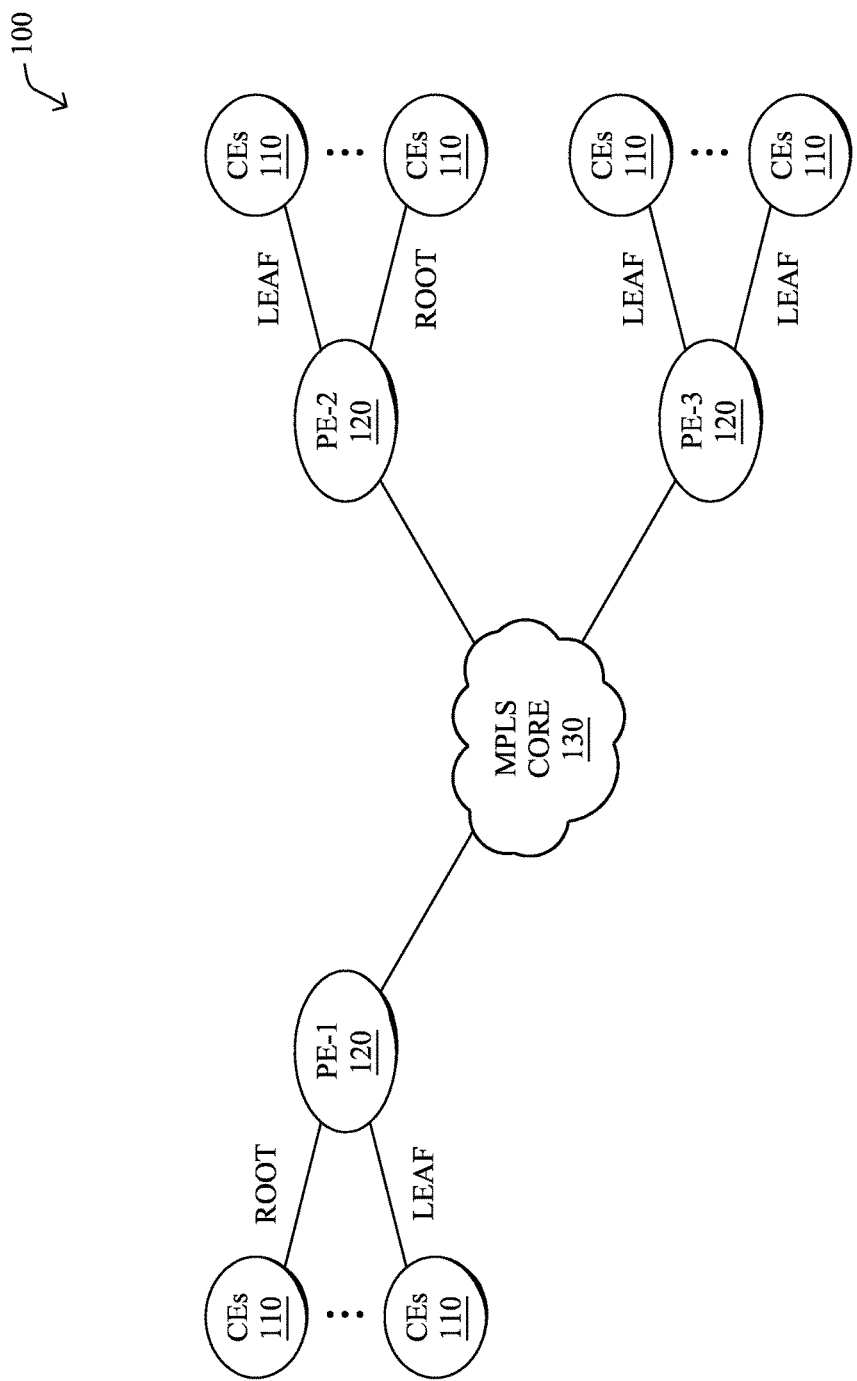
FIG. 3 illustrates an example view of the computer network with respect to root and leaf segments.

As noted above, Ethernet Virtual Private Tree (E-TREE), or rooted point-to-multipoint Ethernet Virtual Connection (EVC), is a Layer 2 service defined by the Metro-Ethernet Forum (MEF) that provides an Ethernet virtual local area network (VLAN) configuration suitable for multicast services. The sites in an E-TREE service have constrained connectivity, and are designated as being Root and/or Leaf. The service is set up such that Root sites can communicate with all other sites (Root or Leaf), and Leaf sites can communicate with Root sites, but not with other Leaf sites. For example, as shown in FIG. 3, certain Ethernet segments (attachment circuits) may be labelled as roots ("ROOT") or leaves ("LEAF"), according to configuration policies as will be appreciated by those skilled in the art.

As also noted above, however, all solutions for addressing E-TREE in L2VPN (whether for virtual private LAN service (VPLS), Virtual Private Multicast Service (VPMS) or EVPN) rely on an egress-filtering model. This means that the egress (i.e., disposition) PE decides on whether to forward or drop traffic destined to a local attachment circuit, to satisfy the E-TREE connectivity constraints. This model unnecessarily wastes the bandwidth of the MPLS network, where leaf-to-leaf traffic, all known unicast traffic, and ingress-replicated multi-destination traffic (broadcast, unicast unknown, and multicast (BUM) traffic), is transported over the MPLS network only to be dropped on the egress PE.

The techniques herein, on the other hand, provide a mechanism for E-TREE support in EVPN with ingress filtering optimization for unicast and multi-destination traffic with ingress replication. Specifically, according to one or more embodiments of the disclosure as described in detail below, an ingress PE device of a computer network domain learns new MAC addresses locally, and determines whether the MAC addresses were each learned over a root or leaf Ethernet segment, respectively. As such, when receiving a frame at the ingress PE device destined to a destination MAC address, it can determine whether the frame was received on a root or leaf ingress segment, and also whether the destination MAC address is located via a root or a leaf Ethernet segment. Accordingly, the ingress PE device may either drop or forward the frame based on the ingress segment and destination MAC address segment being either a root or a leaf, respectively.

Illustratively, the techniques described herein may be performed by hardware, software, and/or firmware, such as in accordance with the ingress filtering process 248/248a, which may contain computer executable instructions executed by the processor 220 (or independent processor of interfaces 210) to perform functions relating to the techniques described herein, e.g., in conjunction with routing process 244. For example, the techniques herein may be treated as extensions to conventional edge router protocols, and as such, may be processed by similar components understood in the art that execute those protocols, accordingly.

Operationally, for ingress filtering of unicast frames, when an EVPN PE learns a new MAC address locally over an attached Ethernet Segment, it indicates in the MAC Advertisement route whether the address was learned over a Root or Leaf segment. This may be illustratively accomplished through introducing a flag to indicate the Root/Leaf indication in the EVPN MAC advertisement route or in a new BGP attribute. FIG. 4 illustrates a simplified table 400 (e.g., forwarding table, a data structure 245) that may store MAC addresses 405, corresponding forwarding information 410, and the newly introduced root/leaf indication. Those skilled in the art will appreciate that the simplified table 400 is merely for illustration, and is not meant to be limiting to the scope of the embodiments herein (e.g., other information and/or formats may achieve similar results yet may still be used in accordance with the techniques herein to indicate whether the address was learned over a Root or Leaf segment).

According to the techniques herein, therefore, when a PE receives a MAC advertisement route, it installs the "Root/Leaf" indication on a per MAC address basis in its forwarding table. This may be a single-bit flag associated with every MAC address table entry. As such, when the PE receives Ethernet frames destined to a given MAC address, it would then:

Determine whether the frame came in on a Root or Leaf segment; and

Perform a MAC address table lookup on the destination address to determine whether the destination corresponds to a Root or Leaf.

The ingress PE can then decide whether to drop or forward the frame based on the combination of the MAC lookup and the Root/Leaf designation of the incoming interface, according to the rules of E-TREE forwarding (i.e., root-to-any, any-to-root, and no leaf-to-leaf communication).

Figure 5A:
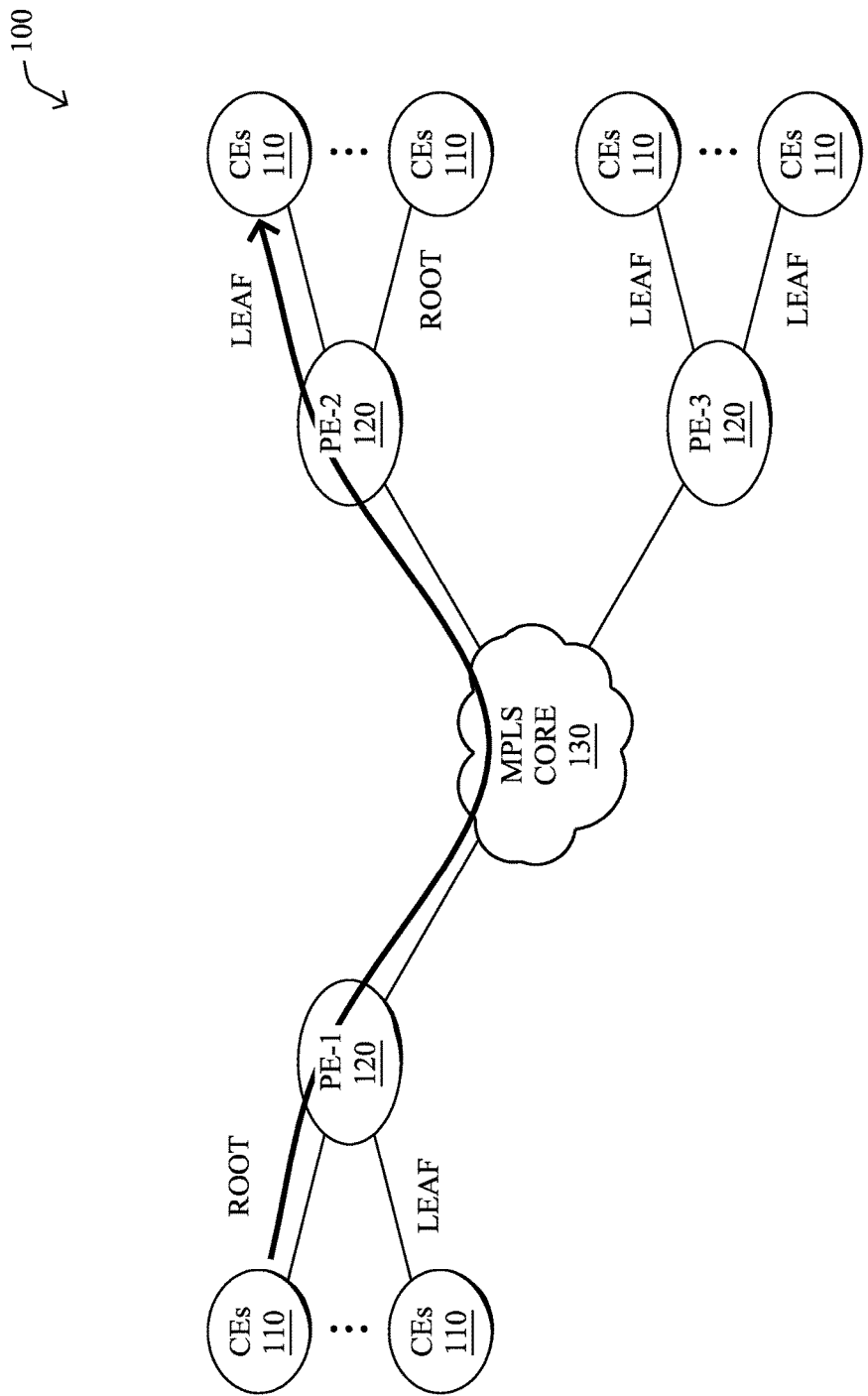
FIGS. 5A-5C illustrate examples of unicast frame ingress filtering.
Figure 5B:
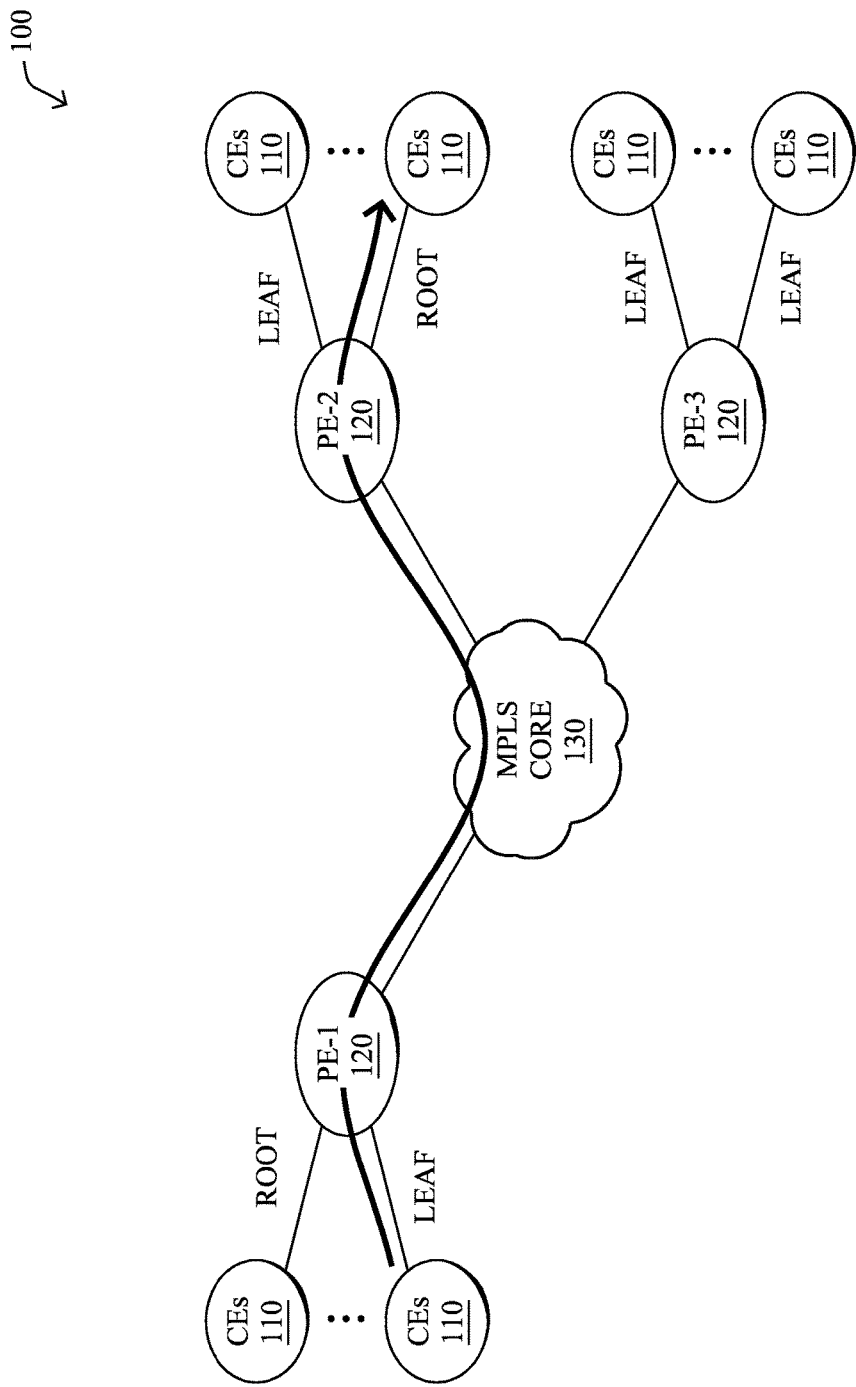
Figure 5C:
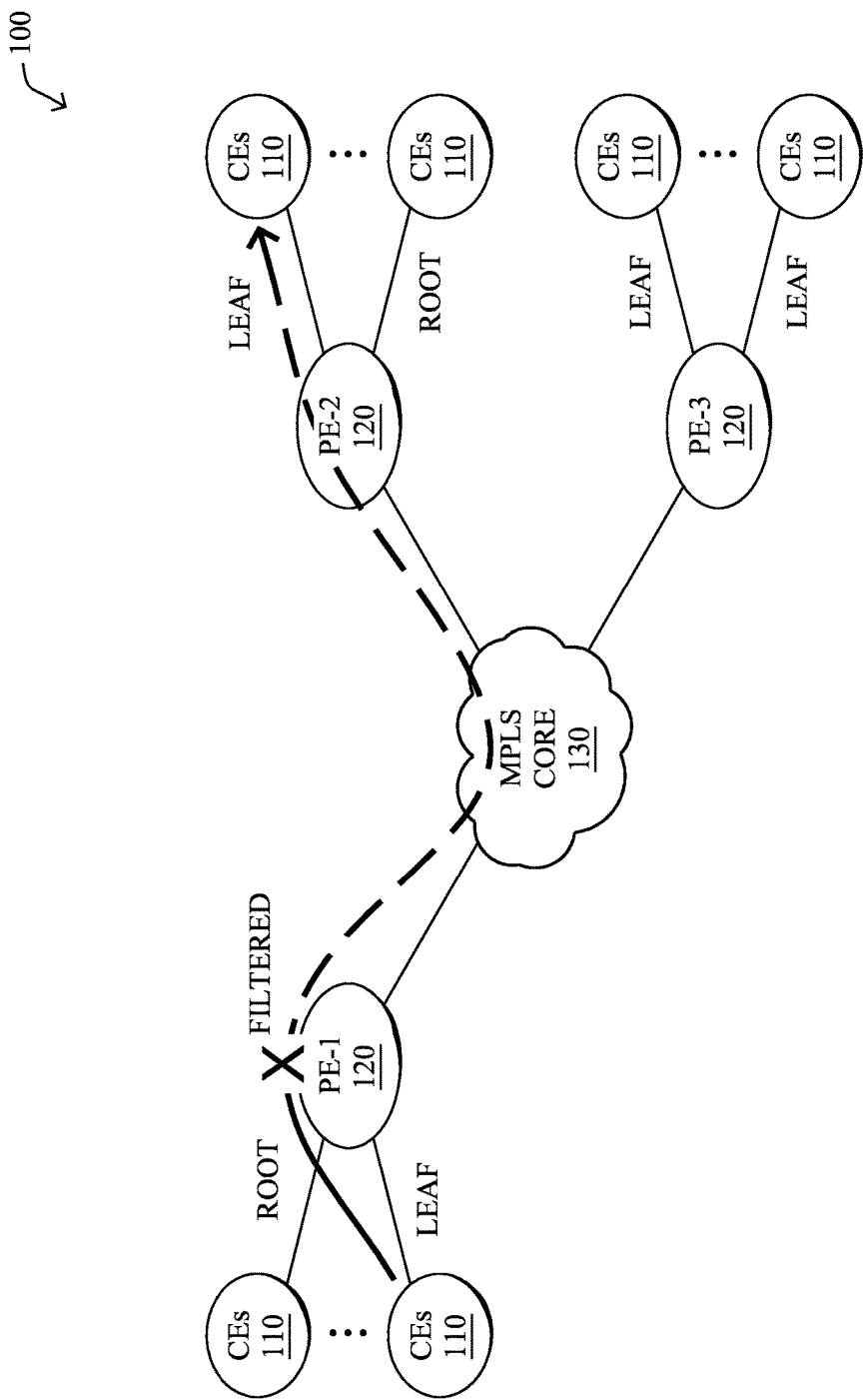

FIGS. 5A-5C illustrate some examples of unicast frame ingress filtering according to the techniques herein. In particular, FIG. 5A illustrates the instance where a frame (e.g. packet 140, represented by the thick arrow) is received from a root segment at ingress PE-1, and is destined to a leaf segment beyond PE-2. Since this source-destination pairing is root-leaf, the frame is permitted. (Note that the decision to forward or drop a packet based on ingress filtering may be simplified in the case where the frame is received from a root segment, since root segments may communicate with either a root or a leaf, and as such, no further processing of the destination root/leaf designation is necessary.) Also, in FIG. 5B, a leaf-root communication is also allowed, where PE-1 receives a frame from a leaf segment, and it is destined to a root segment. Conversely, as shown in FIG. 5C, when receiving a frame from a leaf segment that is destined to another leaf segment, PE-1 drops (ingress filters) the frame prior to it entering the core network toward PE-2.

In addition to unicast frames, the techniques herein may also be applied to ingress filtering of multi-destination frames. For instance, in the IETF Internet Draft entitled "E-TREE Support in EVPN"<draft-sajassi-l2vpn-evpn-etree> by Sajassi et al, a mechanism is defined by which a PE can advertise Leaf/Root indication, on a per Ethernet Segment basis, using the EVPN Ethernet auto-discovery (A-D) route. According to one or more embodiments herein, a mechanism is also defined by which a PE which receives those advertisements can use the data to perform ingress filtering on multi-destination frames, in the case of Ingress Replication.

Specifically, the illustrative mechanism herein is as follows: on a per EVPN instance (EVI) basis, a PE examines all the Ethernet A-D routes received from a given remote "PEr". From those routes, the local PE can determine whether PEr has attached Root segments, Leaf segments, or both. If PEr has both Root and Leaf segments (e.g., PE-2), then it is treated as if it has Root segments for the purpose of the procedures that follow. Conversely, if it only has Leaf segments (e.g., PE-3), then it is a considered a leaf PE.

When constructing the per bridge domain (BD) flood list, the PE marks the flood list entry of each remote PEr with the flag indicating Root/Leaf indication, as determined above (e.g., in a similar manner to the table in FIG. 4). When a multi-destination frame is received by the PE over a local Segment, it marks whether the frame was received over a Root or Leaf segment. The PE then iterates over the flood list entries and does not replicate any frames towards a PE that is marked as Leaf if the local segment is a leaf segment.

Figure 6:
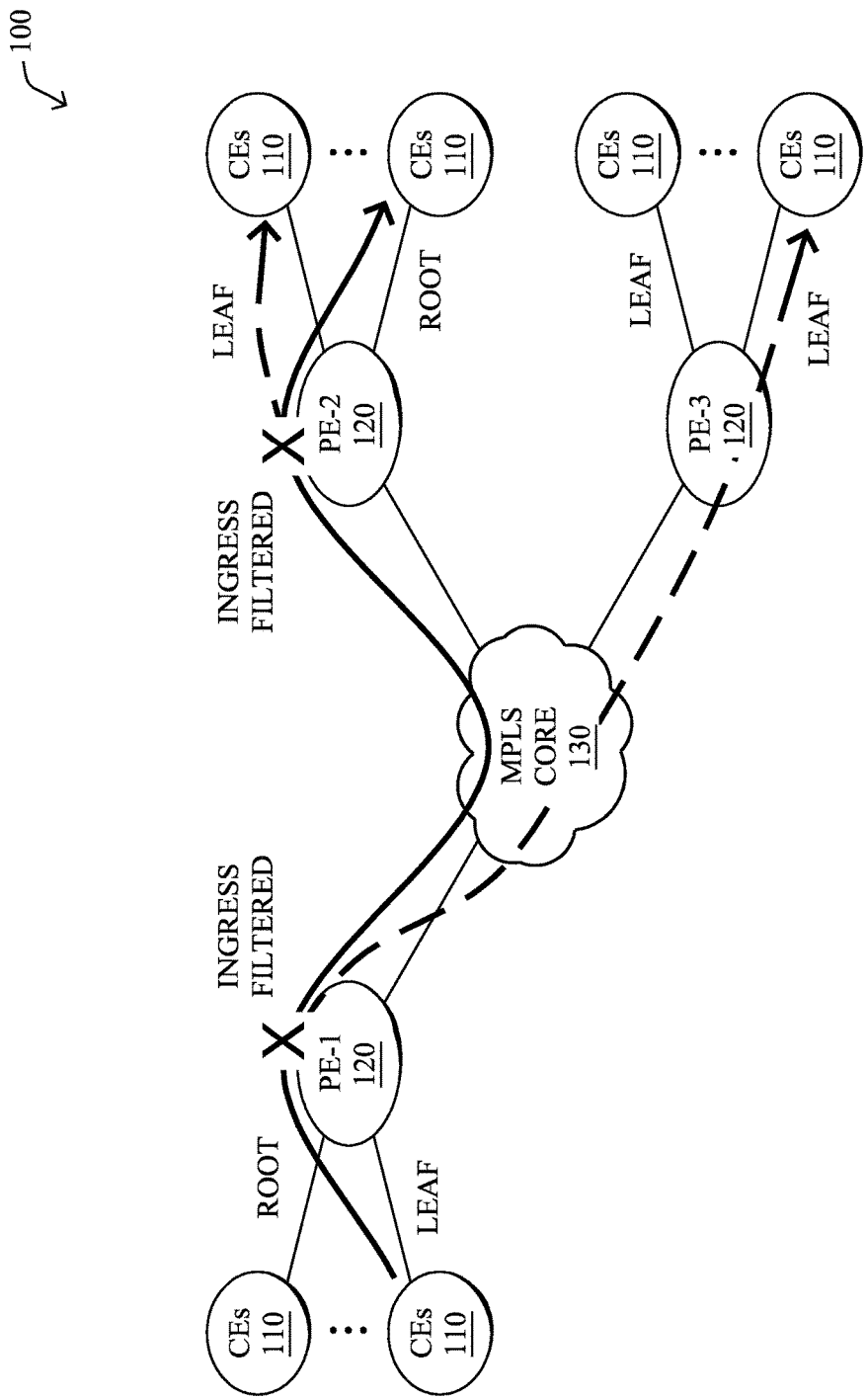
FIG. 6 illustrates an example of multi-destination frame ingress forwarding.

For example, as shown in FIG. 6, PE-1 may receive a frame from a leaf segment destined to multiple destinations beyond PE-2 and PE-3. Since PE-2 is listed as a root PE (i.e., it has one or more root segments), PE-1 replicates (forwards) the frame to PE-2. However, PE-1 would not replicate the frame to PE-3 (ingress filtered), since PE-3 has only leaf segments, and thus only leaf-to-leaf communication would result.

Note that this mechanism does not eliminate the need for the egress PE to perform filtering (e.g., PE-2). Rather, it focuses on addressing the issue of wasting bandwidth by sending frames to a PE that will drop them (e.g., PE-3). In particular, as in FIG. 6, the frame sent to PE-2 would require egress filtering to prevent the frame from being transmitted on any leaf segments, accordingly.

Figure 7:
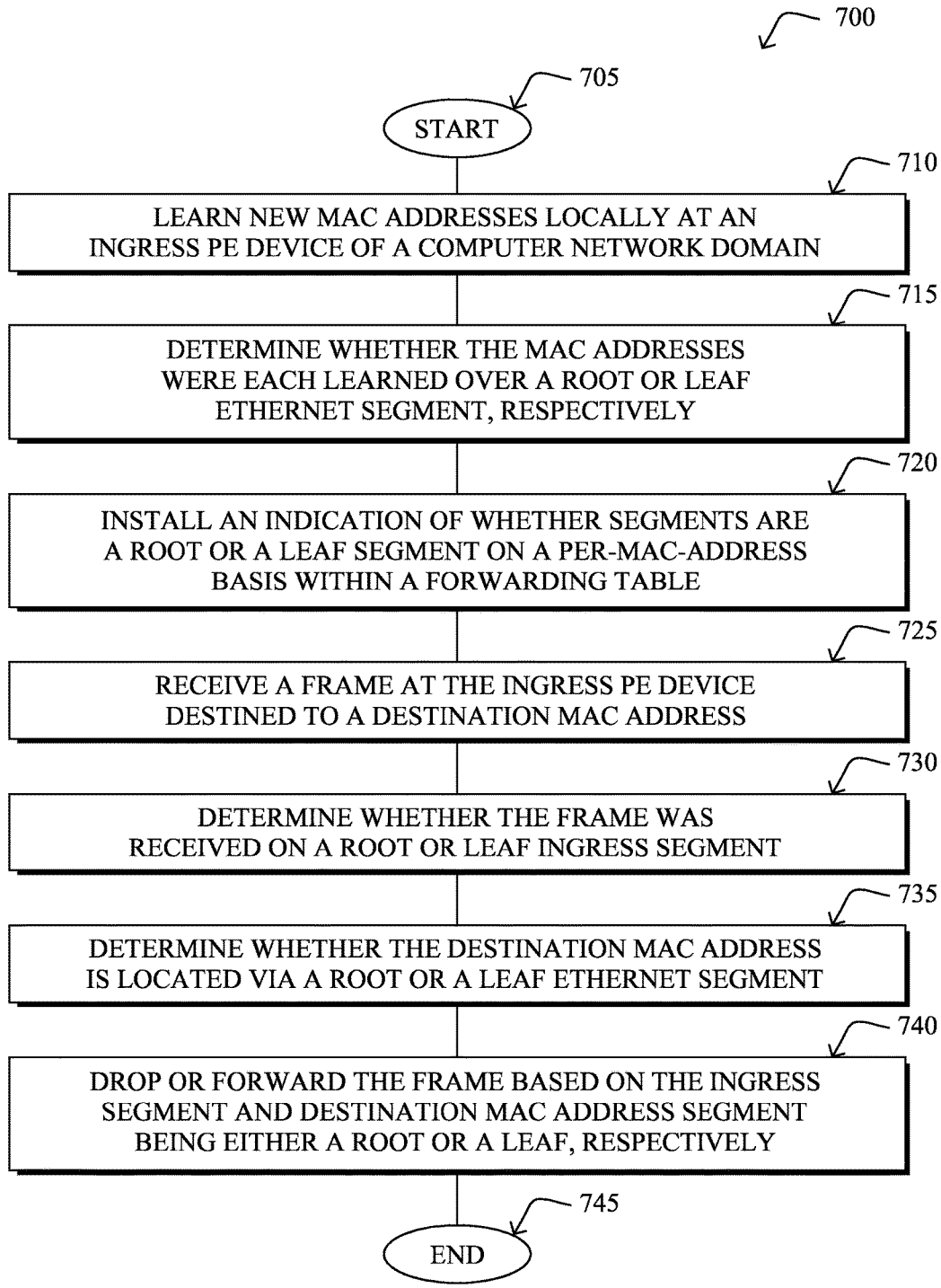
FIG. 7 illustrates an example simplified procedure for E-TREE service with optimal forwarding in EVPN in accordance with one or more embodiments described herein.

FIG. 7 illustrates an example simplified procedure 700 for E-TREE service with optimal forwarding in EVPN in accordance with one or more embodiments described herein, particularly from the perspective of an ingress PE (and where the computer network domain may be an E-TREE, where roots communicate with all other roots and leaves, and leaves communicate only with roots). The procedure 700 may start at step 705, and continues to step 710, where, as described in greater detail above, the PE learns new MAC addresses locally. In step 715, the PE determines whether the MAC addresses were each learned over a root or leaf Ethernet segment, respectively (e.g., based on a flag within a MAC advertisement route or based on a BGP attribute field). In step 720, the PE may then install an indication of whether segments are a root or a leaf segment on a per-MAC-address basis within a forwarding table (e.g., table 400). Note that for remote PE devices (egress PEs), such PEs have either root segments, leaf segments, or both, and where a particular egress PE device has both root and leaf segments, the particular egress PE is marked as a root.

Upon receiving a frame at the ingress PE device destined to a destination MAC address in step 725, the ingress PE determines whether the frame was received on a root or leaf ingress segment in step 730. In addition, in step 735, the ingress PE determines whether the destination MAC address is located via a root or a leaf Ethernet segment. According to the rules of root and leaf inter-communication, in step 740 the ingress PE may then perform ingress filtering by dropping or forwarding the frame based on the ingress segment and destination MAC address segment being either a root or a leaf, respectively. That is, as described above, the sites in an E-TREE service have constrained connectivity, where Root sites can communicate with all other sites (Root or Leaf), and Leaf sites can communicate with Root sites, but not with other Leaf sites. Note that in step 740, where the frame is destined to a plurality of destinations, the ingress PE may perform multi-destination ingress filtering by preventing forwarding the frame to any egress PE device marked as a leaf when the frame is received on a leaf segment.

The simplified procedure 700 may then end in step 745, notably with the option to learn new MAC addresses in step 710 and to receive further frames in step 725. It should be noted that while certain steps within procedure 700 may be optional as described above, the steps shown in FIG. 7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide for E-TREE service with optimal forwarding in EVPN. In particular, the techniques herein provide ingress filtering of known unicast traffic, as well as ingress filtering of multi-destination traffic (broadcast, multicast and unknown unicast) in the case of Ingress Replication. Furthermore, the techniques herein provide optimal use of EVPN network bandwidth, and do so in a generally straightforward manner on EVPN PEs, e.g., supporting the features on current PEs with minimal incremental development in the data-plane.

While there have been shown and described illustrative embodiments that provide for E-TREE service with optimal forwarding in EVPN, it is to be understood that various other adaptations and modifications may be made within the spirit and scope of the embodiments herein. For example, the embodiments have been shown and described herein with relation to specific protocols and naming conventions. However, the embodiments in their broader sense are not as limited, and may, in fact, be used with other types of suitable protocols and/or naming conventions. For instance, other protocols similar to E-TREE, Rooted Multi-point EVC, L2VPN, etc., may benefit from the techniques herein.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   learning new media access control (MAC) addresses at an ingress provider edge (PE) device;
   determining, by the ingress PE device, whether the MAC addresses were each learned over a root Ethernet segment or a leaf Ethernet segment, respectively;
   storing, on the ingress PE device, the new MAC addresses in a table, the table including an indication whether each MAC address was learned over a root or a leaf ingress Ethernet segment, respectively;
   receiving a frame at the ingress provider edge (PE) device of a computer network domain destined to a destination media access control (MAC) address;
   performing a filtering operation at the ingress PE device by dropping or forwarding the frame based on the ingress Ethernet segment and destination MAC address being either a root or a leaf Ethernet segment, respectively; and
   forwarding the frame when the frame is determined to have been received from any type of ingress segment and the destination MAC address is located via a root Ethernet segment, wherein filtering is again performed at an egress PE device of the computer network domain.

2. The method as in claim 1, further comprising:
   determining whether Ethernet segments are a root or leaf Ethernet segment based on a flag within a MAC advertisement route.

3. The method as in claim 1, further comprising:
   determining whether Ethernet segments are a root or leaf Ethernet segment based on a border gateway protocol (BGP) attribute field.

4. The method as in claim 1, further comprising:
   installing an indication of whether Ethernet segments are a root or leaf Ethernet segment on a per-MAC-address basis within a forwarding table.

5. The method as in claim 1, wherein the computer network domain is an E-TREE, and wherein roots communicate with all other roots and leaves, and leaves communicate only with roots.

6. The method as in claim 1, wherein the frame is destined to a plurality of destinations, the method further comprising:
   preventing forwarding the frame to any egress PE device marked as a leaf when the frame is received on a leaf Ethernet segment.

7. The method as in claim 1, wherein the egress PE device has either a root Ethernet segment, leaf Ethernet segment, or both, and where the egress PE device has both root and leaf Ethernet segments, the egress PE is marked as a root.

8. An apparatus, comprising:
   one or more network interfaces to communicate as an ingress provider edge (PE) device in a computer network domain, the network interfaces defining Ethernet segments;
   a processor coupled to the network interfaces and configured to execute one or more processes; and
   a memory configured to store a process executable by the processor, the process when executed operable to:
   learn new media access control (MAC) addresses at the ingress PE device;
   determine whether the MAC addresses were each learned over a root Ethernet segment or a leaf Ethernet segment, respectively;
   store the new MAC addresses in a table, the table including an indication whether each MAC address was learned over a root or a leaf ingress Ethernet segment, respectively;

receive a frame at the ingress PE device destined to a destination media access control (MAC) address;

perform a filtering operation at the ingress PE device by dropping or forwarding the frame based on the ingress Ethernet segment and destination MAC address being either a root or a leaf Ethernet segment, respectively; and forward the frame when the frame is determined to have been received from any type of ingress segment and the destination MAC address is located via a root Ethernet segment, wherein filtering is again performed at an egress PE device of the computer network domain.

9. The apparatus as in claim 8, wherein the process when executed is further operable to:

determine whether segments are a root or a leaf segment based on a flag within a MAC advertisement route.

10. The apparatus as in claim 8, wherein the process when executed is further operable to:

determine whether segments are a root or a leaf segment based on a border gateway protocol (BGP) attribute field.

11. The apparatus as in claim 8, wherein the process when executed is further operable to:

install an indication of whether segments are a root or a leaf segment on a per-MAC-address basis within a forwarding table.

12. The apparatus as in claim 8, wherein the computer network domain is an E-TREE, and wherein roots communicate with all other roots and leaves, and leaves communicate only with roots.

13. The apparatus as in claim 8, wherein the frame is destined to a plurality of destinations, and wherein the process when executed is further operable to:

prevent forwarding the frame to any egress PE device marked as a leaf when the frame is received on a leaf segment.

14. The apparatus as in claim 8, wherein egress PE devices have either root segments, leaf segments, or both, and where a particular egress PE device has both root and leaf segments, the particular egress PE is marked as a root.

15. A tangible, non-transitory, computer-readable media having software encoded thereon, the software when executed by a processor on an ingress provider edge device operable to:

learn new media access control (MAC) addresses at the ingress provider edge (PE) device;

determine whether the MAC addresses were each learned over a root Ethernet segment or a leaf Ethernet segment, respectively;

store the new MAC addresses in a table, the table including an indication whether each MAC address was learned over a root or a leaf ingress Ethernet segment, respectively;

receive a frame at the ingress PE device destined to a destination media access control (MAC) address;

perform a filtering operation at the ingress PE device by dropping or forwarding the frame based on the ingress Ethernet segment and destination MAC address being either a root or a leaf Ethernet segment, respectively; and forward the frame when the frame is determined to have been received from any type of ingress segment and the destination MAC address is located via a root Ethernet segment, wherein filtering is again performed at an egress PE device of the computer network domain.

16. The computer-readable media as in claim 15, wherein the software when executed is further operable to:

determine whether Ethernet segments are a root or leaf Ethernet segment based on a flag within a MAC advertisement route.

17. The computer-readable media as in claim 15, wherein the software when executed is further operable to:

determine whether Ethernet segments are a root or leaf Ethernet segment based on a border gateway protocol (BGP) attribute field.

18. The computer-readable media as in claim 15, wherein the software when executed is further operable to:

install an indication of whether Ethernet segments are a root or leaf Ethernet segment on a per-MAC-address basis within a forwarding table.

19. The computer-readable media as in claim 15, wherein the computer network domain is an E-TREE, and wherein roots communicate with all other roots and leaves, and leaves communicate only with roots.

20. The computer-readable media as in claim 15, wherein the frame is destined to a plurality of destinations, and wherein the software when executed is further operable to:

prevent forwarding the frame to any egress PE device marked as a leaf when the frame is received on a leaf Ethernet segment.

* * * * *